Sept. 27, 1932.    G. W. HENRY, JR    1,879,233
MACHINE FOR APPLYING TICKETS TO MERCHANDISE
Filed Aug. 20, 1930    8 Sheets-Sheet 1
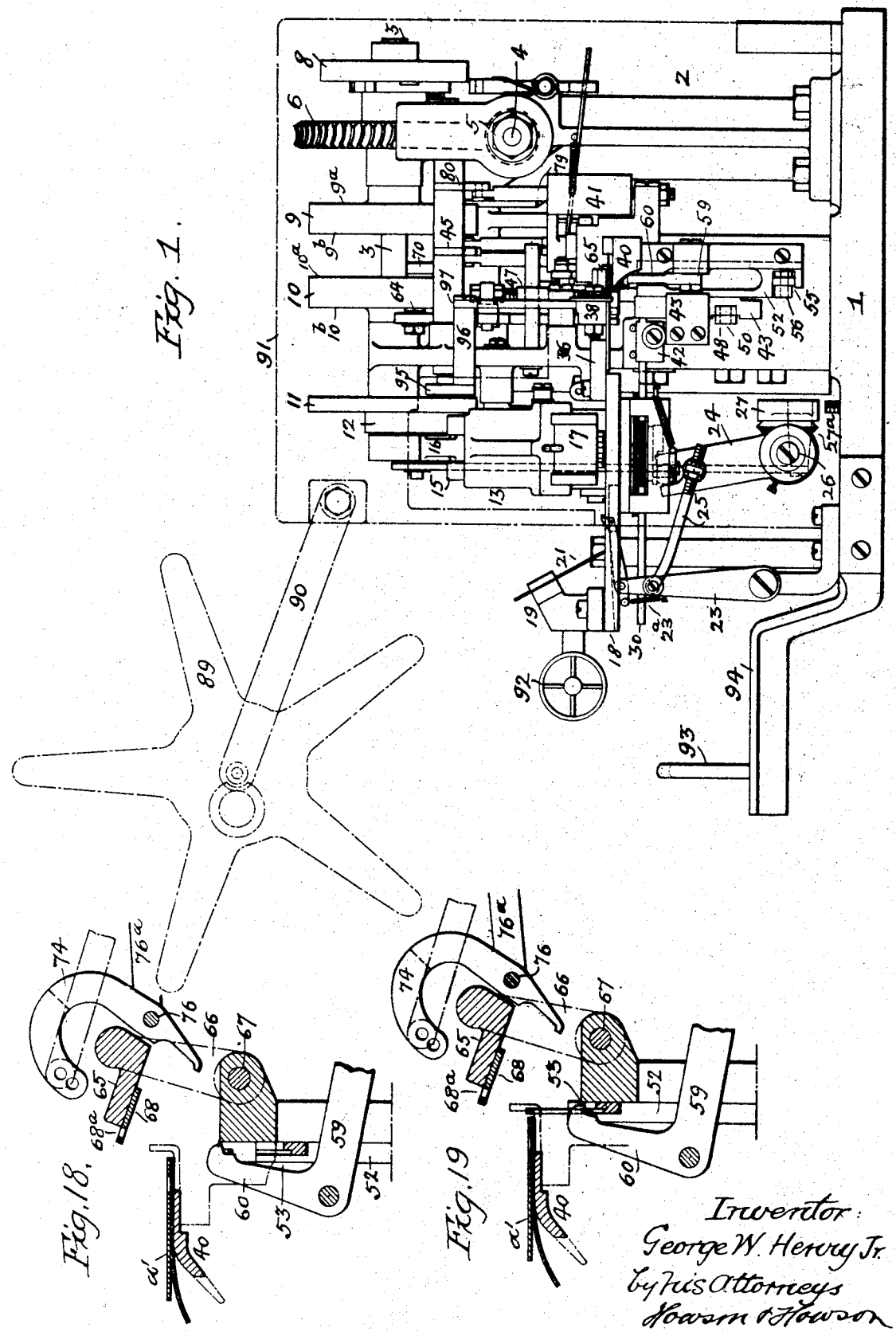
Inventor:
George W. Henry Jr.
by his Attorneys
Howson & Howson Sept. 27, 1932. G. W. HENRY, JR 1,879,233
MACHINE FOR APPLYING TICKETS TO MERCHANDISE
Filed Aug. 20, 1930 8 Sheets-Sheet 2
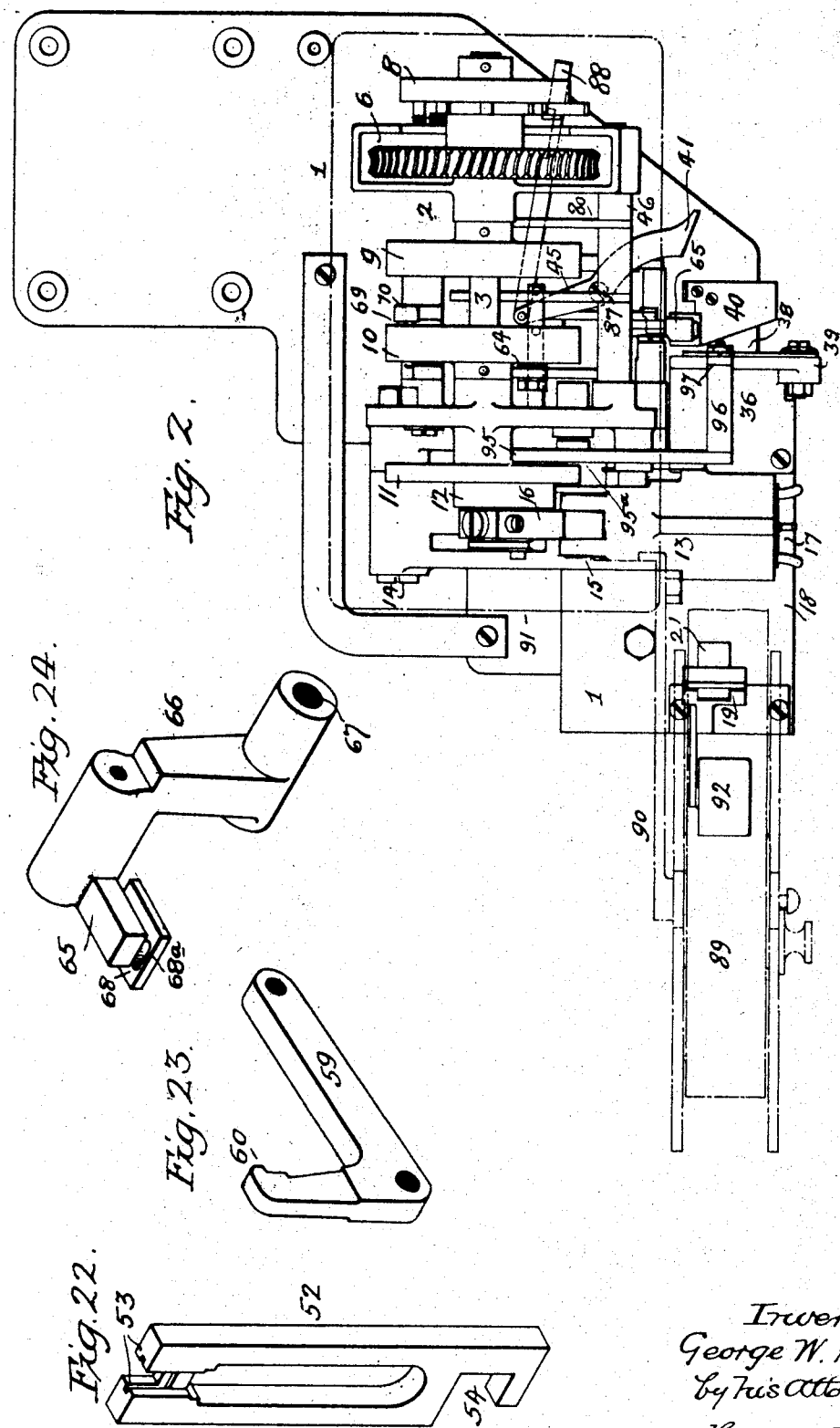
Inventor:
George W. Henry Jr.
by his Attorneys
Howson & Howson Sept. 27, 1932.   G. W. HENRY, JR   1,879,233
MACHINE FOR APPLYING TICKETS TO MERCHANDISE
Filed Aug. 20, 1930   8 Sheets-Sheet 3
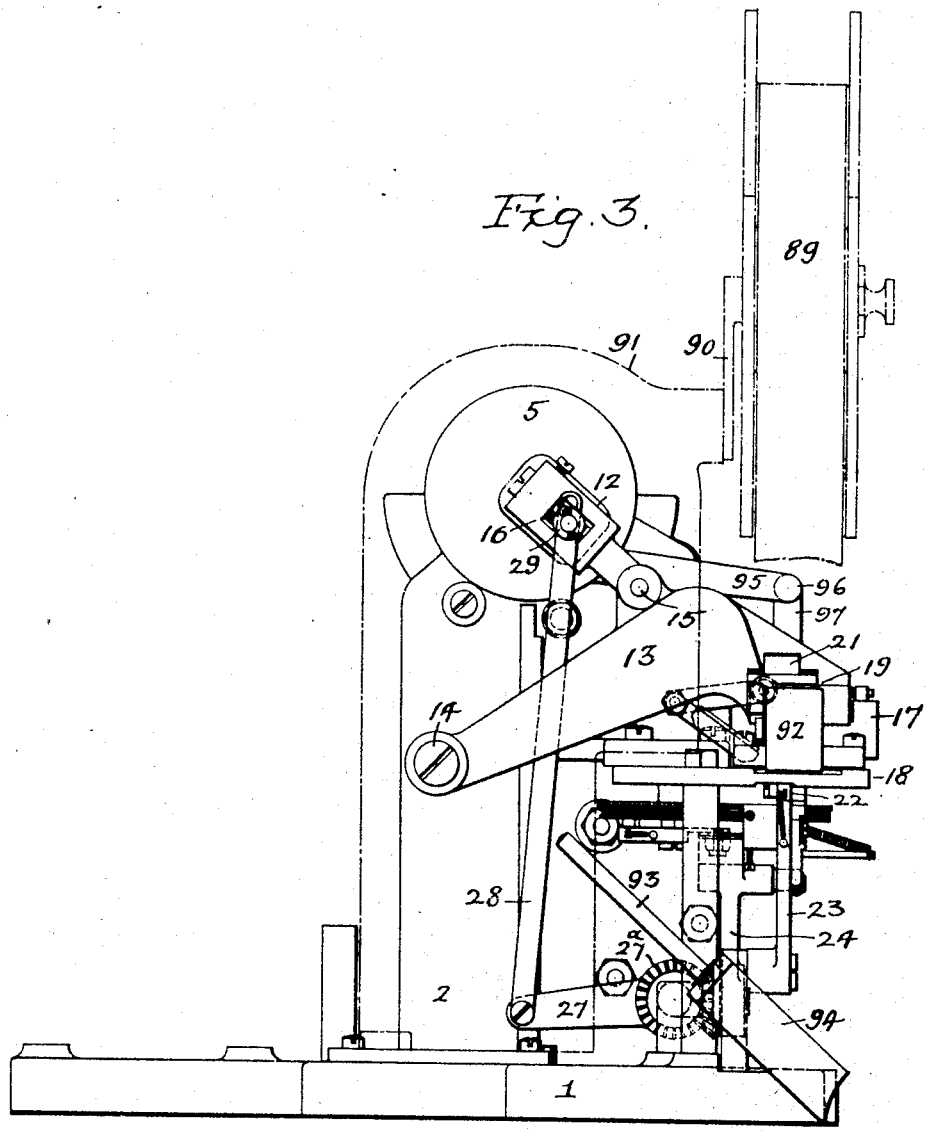

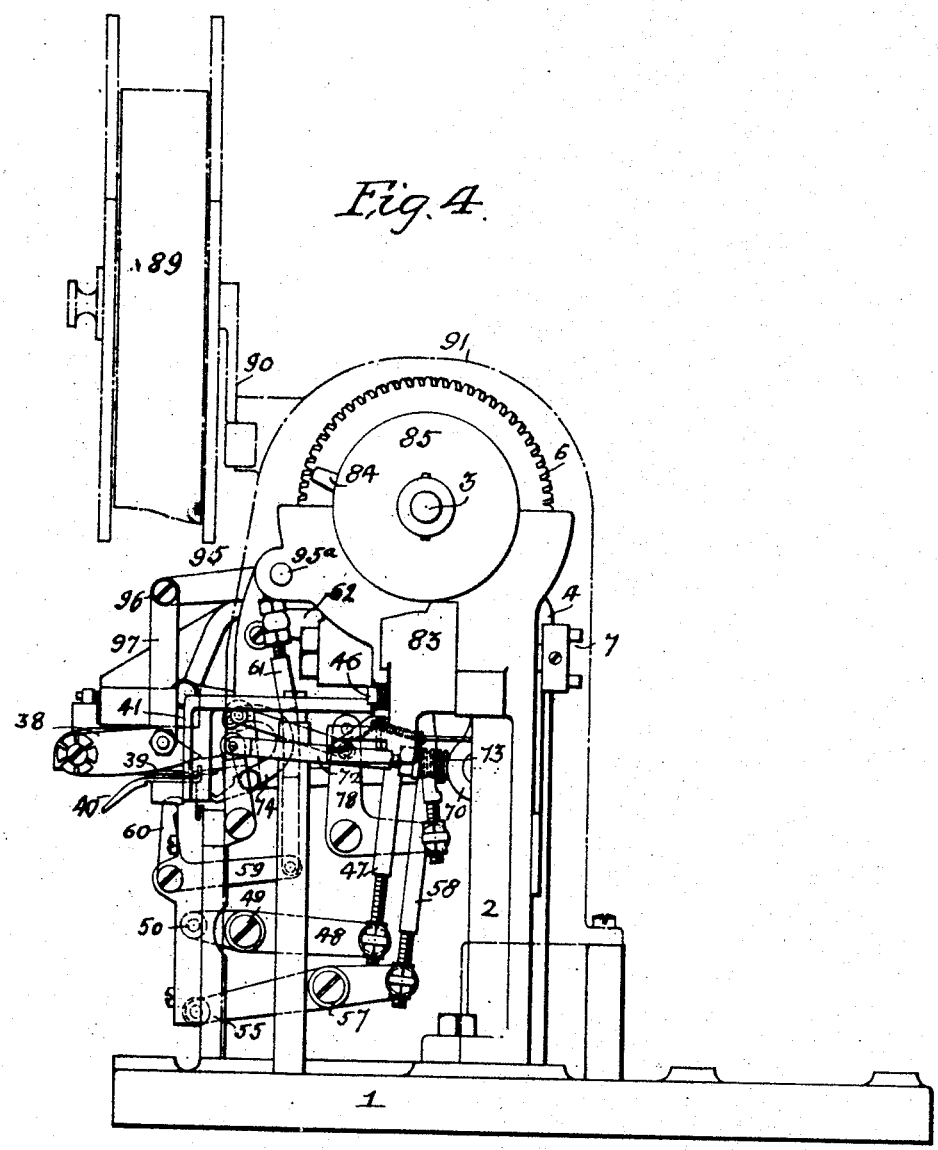

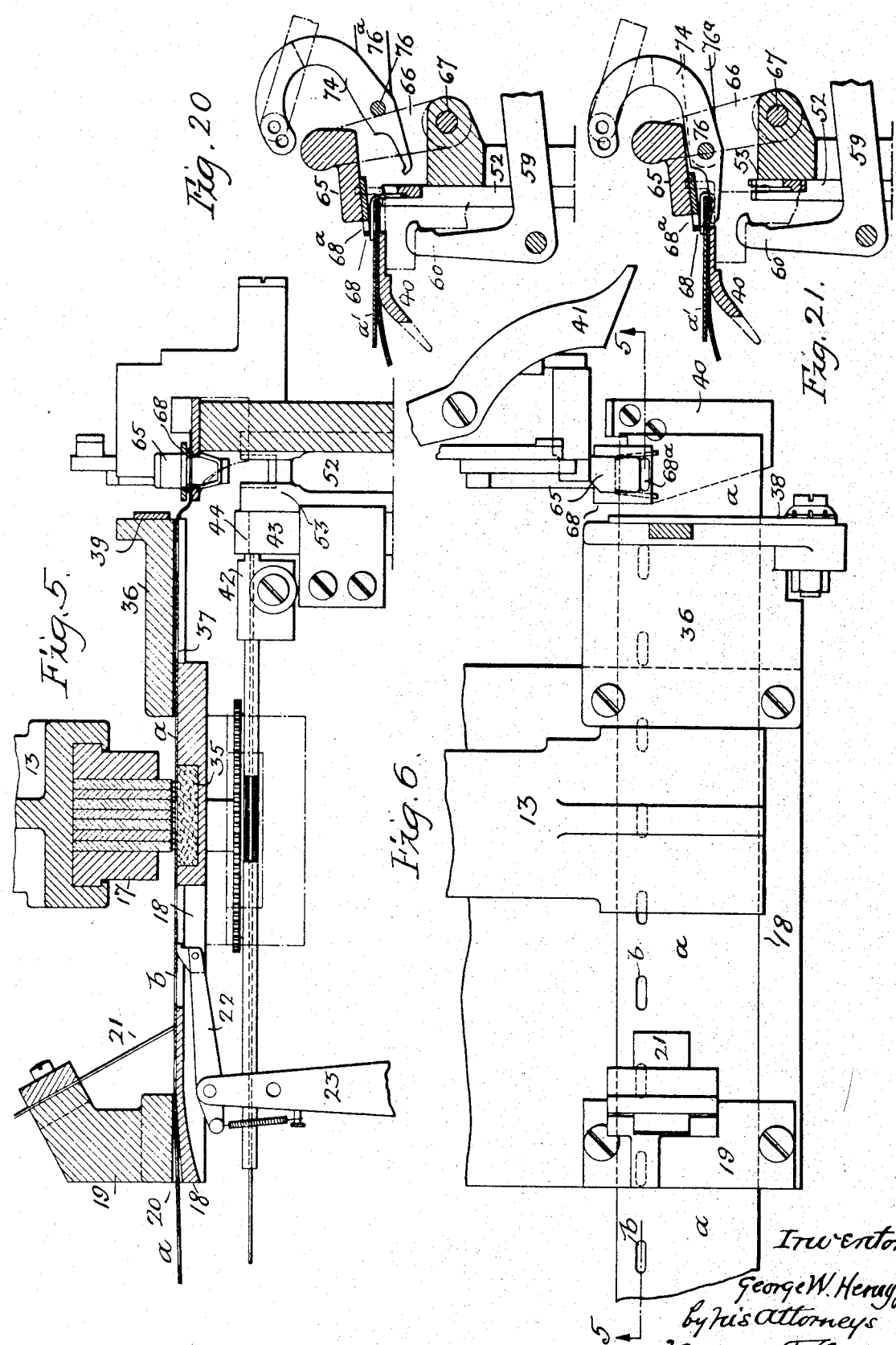

Sept. 27, 1932.  G. W. HENRY, JR  1,879,233
MACHINE FOR APPLYING TICKETS TO MERCHANDISE
Filed Aug. 20, 1930  8 Sheets-Sheet 6
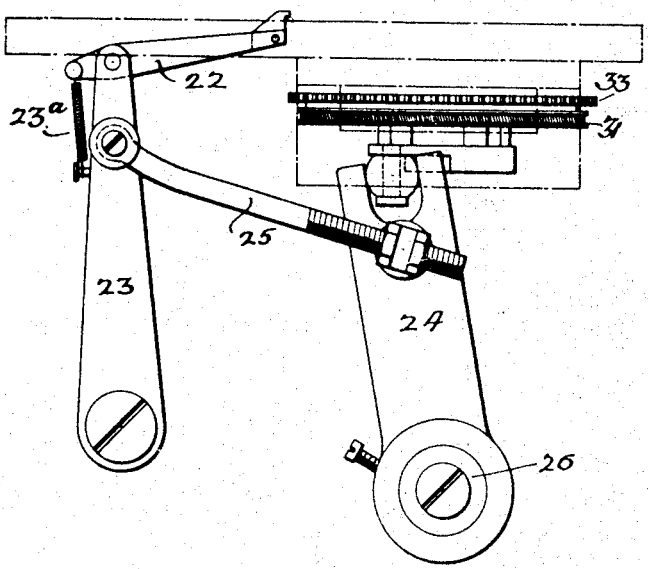
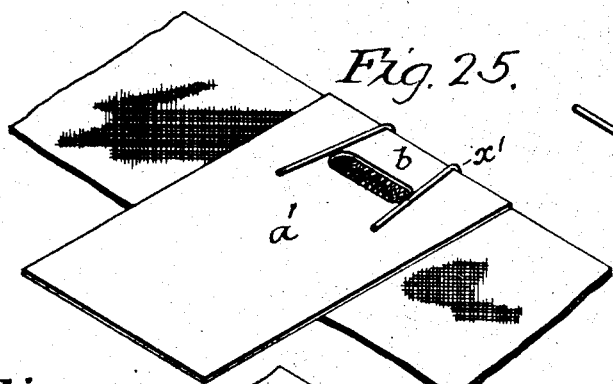
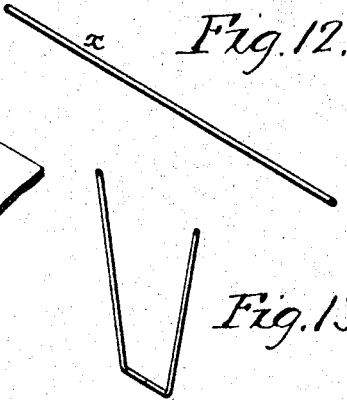
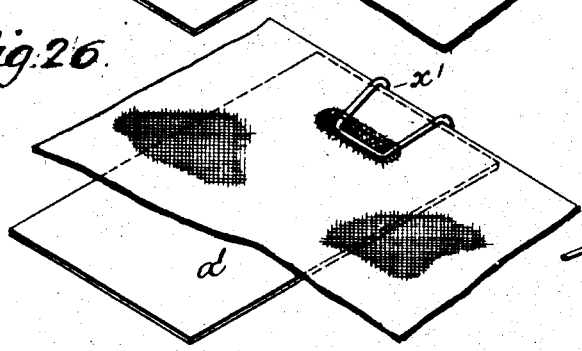
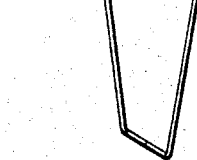
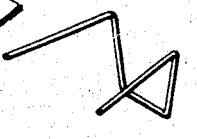
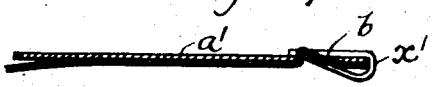
Inventor:
George W. Henry Jr
by his attorneys
Howson & Howson Sept. 27, 1932.     G. W. HENRY, JR     1,879,233
MACHINE FOR APPLYING TICKETS TO MERCHANDISE
Filed Aug. 20, 1930     8 Sheets-Sheet 7
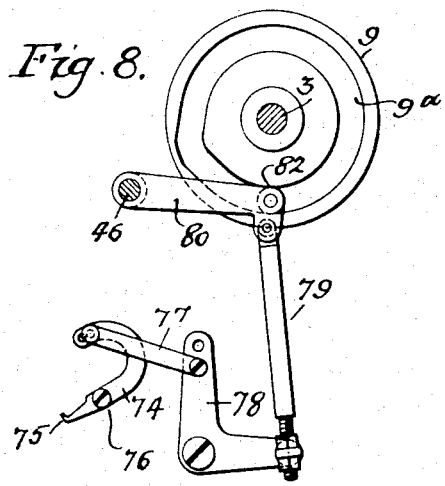
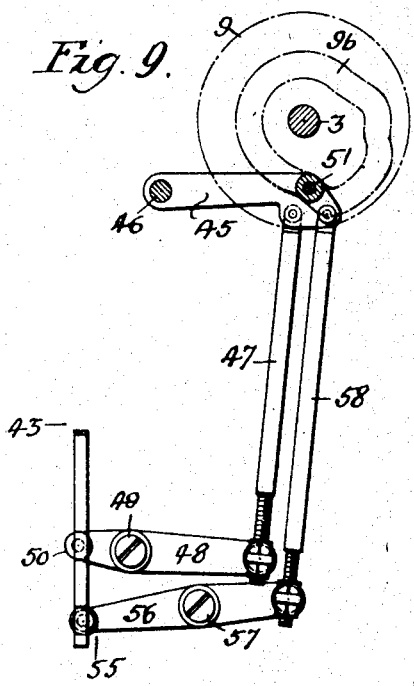
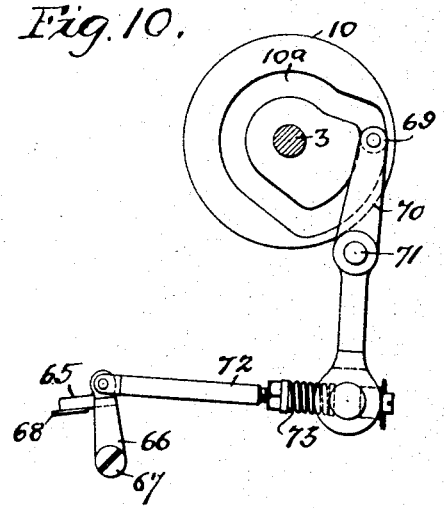
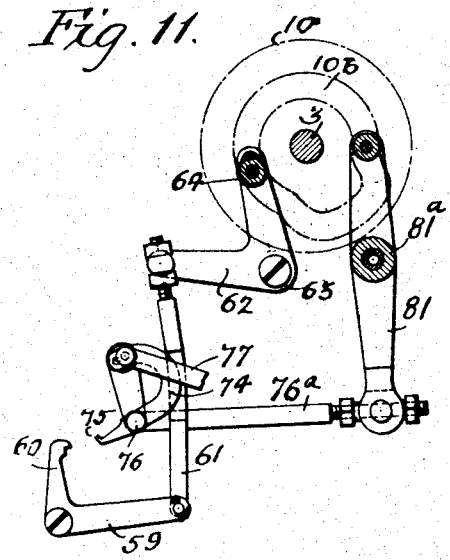
Inventor
George W. Henry Jr.
by his Attorneys
Howson & Howson Sept. 27, 1932. G. W. HENRY, JR 1,879,233
MACHINE FOR APPLYING TICKETS TO MERCHANDISE
Filed Aug. 20, 1930 8 Sheets-Sheet 8
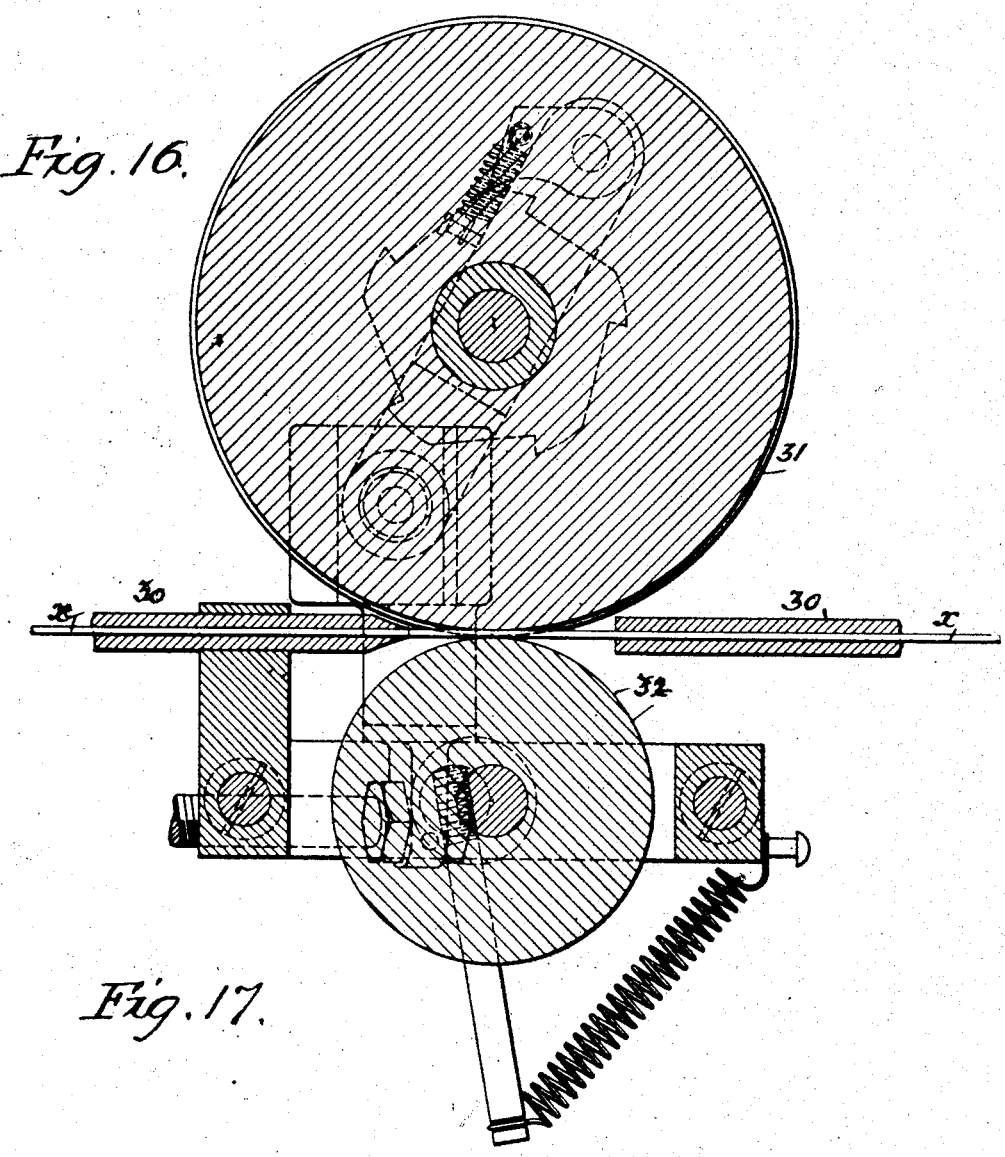
Fig. 16.
Fig. 17.
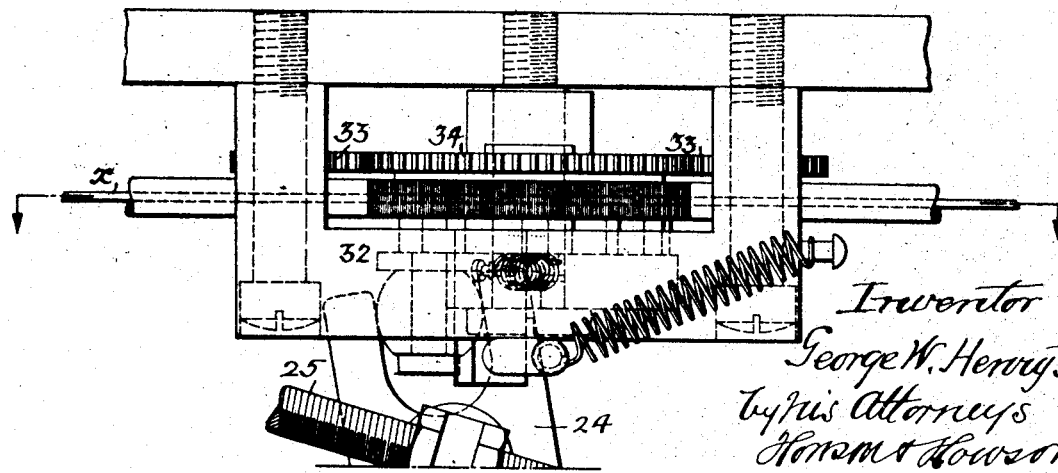
Inventor
George W. Henry Jr
by his Attorneys
Howson & Howson Patented Sept. 27, 1932

1,879,233

UNITED STATES PATENT OFFICE

GEORGE W. HENRY, JR., OF PHILADELPHIA, PENNSYLVANIA, ASSIGNOR TO SOABAR COMPANY, OF PHILADELPHIA, PENNSYLVANIA, A CORPORATION OF PENNSYLVANIA

MACHINE FOR APPLYING TICKETS TO MERCHANDISE

Application filed August 20, 1930. Serial No. 476,647.

My invention relates to certain improvements in means for printing, cutting and applying tickets to merchandise.

The object of my invention is to produce a machine which is used in connection with a slotted or indented ticket, the ticket strip being fed through the machine by means which enters the slots or indentations and feeds the tickets forward intermittently. The ticket is printed and then is cut from the strip and applied to the fabric or other material by a wire clip, which is cut and formed from the wire, and which holds the ticket to the material without puncturing the fabric.

One form of ticket and securing clip which may be used is set forth and claimed in the application for patent filed by me on May 16, 1929, Serial No. 363,605.

In the accompanying drawings:

Fig. 1 is a side elevation of my improved machine for applying tickets to merchandise;

Fig. 2 is a plan view;

Fig. 3 is a view of the left end of the machine;

Fig. 4 is a view of the right end of the machine;

Fig. 5 is an enlarged sectional elevation on the line 5—5, Fig. 6, of the table over which the ticket strip passes and illustrating the feeding, printing, cutting and clip-bending devices;

Fig. 6 is a plan view of the mechanism shown in Fig. 5;

Fig. 7 is a view showing the connection between the ticket-strip feeding mechanism and the wire feeding mechanism;

Figs. 8, 9, 10 and 11 show the mechanism for forming the wire into a U-shaped clip;

Figs. 12 to 15 inclusive are diagrams showing the steps in the forming of the wire to produce the clip which secures the ticket to the material;

Fig. 16 is a sectional plan view of the wire feeding mechanism;

Fig. 17 is a side view of the wire feeding mechanism;

Figs. 18, 19, 20 and 21 are diagrams illustrating the movement of the parts that form the clip and attach it to a ticket and material;

Fig. 22 is a detached perspective view of a forked die;

Fig. 23 is a perspective view of the arm which holds the wire while it is being bent to form a loop;

Fig. 24 is a presser-foot for forcing the clip onto the ticket;

Fig. 25 is a perspective view showing the ticket applied to the material;

Fig. 26 is a reverse view of the material and ticket showing the clip pressing the material into the slot in the ticket;

Fig. 27 is an enlarged sectional view of the ticket and fabric, and showing the clip securely attaching the ticket to the fabric; and Figs. 28 and 29 are views of modified forms of tickets which may be used.

1 is the base plate on which is mounted the frame 2 of the machine. 3 is a cam-shaft driven from a power-shaft 4 through a worm 5 and worm-wheel 6. The power-shaft has a coupling 7 by which it can be coupled to any suitable motor. 8, 9, 10 and 11 are cams on the cam-shaft for actuating certain mechanisms of the machine, and on the left end of the shaft is a crank 12 which actuates the type chase carrying arm 13, the arm being pivoted to the frame at 14 and attached at 15 to an adjustable connecting rod 16, which is actuated by the crank 12. Detachably mounted on the lever is the type chase 17, which carries the type for printing the ticket. This type chase can be of any form without departing from the essential features of the invention.

18 is the bed of the machine over which the ticket-strip passes. At the left end of the bed is a block 19, slotted at 20 to allow for the passage of the ticket-strip $a$, and mounted on the block is a detent plate 21 which yieldingly bears against the ticket-strip and holds it firmly onto the bed, as well as preventing it from receding. The pressure however, is not sufficient to prevent the feeding mechanism from intermittently feeding the strip. The ticket-strip $a$ is preferably slotted at intervals, as at $b$, the interval being equal to the width of the ticket, so that when a ticket $a$—1 is cut from the strip as shown in Fig.

25, the slot will be at the center of the ticket. The ticket may have a perforation b—1, as shown in Fig. 28, or may be indented, as shown at b—2 in Fig. 29. 22 is a feed-pawl for the ticket-strip. This pawl passes through a slot in the bed plate 18 and extends into the slots b in the ticket-strip as they are presented, and feeds the ticket-strip a distance equal to the width of one ticket.

The pawl 22 is carried by an arm 23, and a spring 23a tends to yieldingly project the arm above the surface of the bed 18. The arm 23 is adjustably connected to an arm 24 by a rod 25 and this arm 24 is pivoted at 26, and is geared to a rocking arm 27 by bevel gearing 27a. The rocking arm 27 is connected by a rod 28 to the crank pin 29 on the crank 12.

The arm 24 engages the wire feeding mechanism shown in Figs. 7, 16 and 17, and feeds the wire simultaneously and parallel with the ticket-strip, the wire x extending through guide tubes 30 and being fed by wheels 31 and 32. These two wheels are geared together through gearings 33 and 34.

The bed 18 is recessed directly under the chase 17, so as to receive a pad 35 which forms a platen when the printing mechanism makes an impression on the ticket. A block 36 is slotted at 37 for the passage of the ticket, and pivoted to this block at 39 is the knife 38, which severs a ticket from the strip at this point. The mechanism for actuating this knife will be described hereinafter.

40 is a support for the material to which the ticket is to be attached, and this support is shaped as shown so that the material can be readily adjusted thereon, and the support is slotted for the passage of the wire clip, and for the mechanism which bends the clip over the ticket and clamps it to the material. The details of this mechanism are fully shown in Figs. 8, 9, 10 and 11 and the different steps of forming the clip are shown in Figs. 18, 19, 20 and 21.

41 is a releasing device for releasing the mechanism of the machine to allow it to feed the strip the distance of one ticket and to cut a ticket from the strip, and finally to bend the wire by which the ticket is attached to the material.

The means for forming the wire clip x—1 and for attaching the clip to the ticket and material is as follows:—After the machine has completed an operation the printing block and the strip shearing blade are in the raised position, and the ticket latch is in extreme rearward position. The shearing die for the wire is in position to cut the wire. The wire x passes through a throat in a block 42 and is sheared by the shearing die 43, which is slotted at 44, the lower edge of the slot forming the cutter. This shearing die 43 is actuated by the cam 9, Fig. 9. An arm 45, mounted on a rod 46 carried by a fixed part of the machine, is connected by a rod 47 to a lever 48 pivoted at 49, and connected to the die 43 at 50. The arm 45 has a roller 51 which extends into the cam-slot 9b in the cam 9.

The means for bending the cut section of wire consists of a vertically movable forked die 52, Fig. 22. The forks of the die are slotted at 53 to receive and guide the wire while it is being bent. The lower end of the die 52 is notched at 54, and in this notch is a roller 55 on a lever 56, pivoted at 57, and this lever is connected by a rod 58 to the arm 45, the movement of this arm being controlled by the cam 9 as above mentioned. In order to hold the wire while it is being formed by the forming die 52, a lever 59 is so located that the hooked arm 60 of the lever, see Fig. 23, extends over the forming die 52 and over the wire, Fig. 18, so that when the forming die is raised the hooked arm 60 will remain stationary at the center of the section of wire, Fig. 19. The lever 59 is connected by a rod 61 to one end of the bell crank lever 62, pivoted at 63, and on the other arm of this lever is a roller 64, which extends into the slot 10b in the cam 10, see Fig. 11.

After the loop is formed in the wire as shown in Figs. 13 and 19, the clip x—1 is bent over the fabric and ticket, by a presser-foot 65, shown in Fig. 20, while the looped portion is held by the die 53, and then bent under the fabric as shown in Fig. 21, after the die 52 is withdrawn. This presser-foot, shown in Fig. 24, bends down the two prongs of the clip upon the surface of the ticket, and forms an integral part of an arm 66, pivoted at 67. On the presser-foot is a plate 68 which is slotted at 68a.

This slot 68a is in alignment with the slot b in the ticket to be attached to the material, so as to allow the looped portion of the clip x—1 to press the material into the slot in the ticket.

The arm 66 is actuated by the cam 10, which has a cam-slot 10a in one face, and into this cam-slot extends a roller 69 on a lever 70, pivoted at 71, and yieldingly connected to the arm by a rod 72.

On the rod is a spring 73 and the pressure of this spring can be adjusted so as to increase or decrease the pressure of the presser-foot on the ticket. After the presser-foot has pressed the prongs of the clip onto the face of the ticket, then a lever 74, Fig. 21, engages the looped portion of the clip and forces it against the material, and the short arm of the lever has a lip 75 which forces the loop end of the clip into the slot in the ticket, carrying with it the fabric under the slot, as shown in Fig. 27, locking the ticket firmly to the material. The lever 74 is pivoted at 76, and the long arm of the lever is connected by a link 77 to one arm of the bell crank lever 78. The other arm of this lever is connected by a link 79 to an arm 80 on the rod 46. A roller 82 on this arm extends into a cam-slot 9a of the cam 9, Fig. 8. The pivot 76 for the lever 74 is advanced by the cam 10b through a lever 81 pivoted at 81a. The lever is connected to the pivot 76 by an adjustable rod 76a, Fig. 11.

The knife 38 for cutting a ticket from the strip is actuated in the present instance by a cam 11, through a lever 95, pivoted at 95a, one arm of which has a roller extending into a cam-slot in the face of the cam 11. The other arm of the lever has an extension 96 connected by a link 97 to the knife 38.

I have not described the wire feeding mechanism in detail as I lay no claim for the details of this mechanism, and other wire feeding mechanisms may be used without departing from the main features of the invention.

After the clip attaches the ticket to the material, then the machine is automatically stopped by a latch 83 engaging a lug 84 on a disk 85, secured to the cam-shaft 3. This latch is pivoted at 86 and can be released when the material is placed on the supporting plate 40 by the operator pressing the reversing lever 41, an arm of which is in close proximity to the supporting plate. The lever 41 is pivoted at 87, and is connected to a release rod 88 which engages the latch. When the lever is pressed in by the operator, the latch is released and the machine will make one complete movement and will then be automatically stopped by the latch after the ticket-strip and wire have been fed the distance of one ticket, and the material secured to the ticket by the clip bent from the wire.

In some instances the wire may be bent into U-shaped form by mechanism substantially similar to the wire feeding and bending mechanism of the machine, and then fed to the final bending mechanism which clamps the clip onto the ticket and the material.

In the present instance the reel 89 for the ticket-strip roll is mounted on a bracket 90 secured to the casing 91 which encloses the main mechanism of the machine, as shown by dotted lines in Figs. 1, 3 and 4. The strip passes under a guide wheel 92 to the machine. The spool of wire is mounted on a spindle 93 carried by a bracket 94. The reel and wire spool carrier may be mounted on supports separate from the machine if desired.

It will be seen that by the above-described mechanism tickets are secured to fabrics or other material by clips which do not puncture the fabric. When it is desired to attach two or more pieces of fabric or other material together without a ticket, the ticket-strip can be removed and the wire can be formed into a clip and clamped to the pieces of fabric.

I claim:

1. The combination in a machine for applying tickets to merchandise, of a bed; means for intermittently feeding a perforated ticket-strip over the bed; means for printing each ticket as it passes under the printing mechanism; means for cutting a ticket from the strip; a support for the merchandise, over which the cut ticket is projected; and means for bending a clip over the ticket and under the merchandise, one portion of the clip forcing a portion of the merchandise into the perforation in the ticket.

2. The combination in a machine for applying tickets to material, of means for feeding the ticket through the machine; means for feeding wire to bending mechanism; a support for the material; means in advance of the support for cutting the ticket from a strip; means for cutting and bending the wire into the form of a U-shaped clip; and means for bending the clip over the edge of the ticket, with the U-shaped portion extending into the opening in the ticket, the material being held between the bent portions and the ticket.

3. The combination in a machine for applying tickets to material, of means for intermittently feeding a strip of tickets through the machine; means for printing one of the tickets while the strip is at rest; means for cutting a ticket from the strip; a support for the material to which the ticket is to be applied; means for feeding, cutting and bending a wire in the form of a U-shaped clip, the said cutting and bending means being at the support for the material; and means for bending the clip over and under the ticket and the material.

4. The combination in a machine for applying tickets to material, of means for feeding a perforated ticket-strip through the machine; means for simultaneously feeding wire parallel with the ticket; cutting means for cutting a ticket from the strip; a support for the material to which the ticket is to be applied, said support being immediately beyond the cutting means; and means at the support for first cutting, then bending the wire into U-shaped form to produce a clip, and finally bending the formed clip onto the ticket and material, the U-shaped portion of the ticket forcing the material into the perforation in the ticket.

5. The combination in a machine for applying tickets to material, of means for feeding a perforated ticket-strip through the machine; means for simultaneously feeding wire parallel with the ticket; cutting means for cutting a ticket from the strip; a support for the material to which the ticket is to be applied, said support being immediately beyond the cutting means; and means at the support for cutting the wire, means bending the wire into U-shaped form to produce a clip, and means for bending the prongs of the clip over the ticket, and mechanism for finally bending the U-shaped portion of the ticket under the material and forcing the end of the clip into the perforation in the ticket.

6. The combination in a machine for applying tickets to merchandise, of means for intermittently feeding a ticket-strip through the machine; means for cutting a ticket from the strip when the strip is at rest; a support for merchandise to which a ticket is to be attached, said support being located in the position back of the cutting mechanism, so that the ticket will be above the support when severed; means for feeding a wire to the machine; means for cutting the wire; a hooked arm for engaging the wire; a vertically movable die for bending the wire into U-shape to form a clip while being held by the arm; and means for forcing the clip onto the ticket and material so as to attach the ticket to the material.

7. The combination in a machine for securing tickets to merchandise, of means for intermittently feeding a ticket-strip through the machine; means for cutting a ticket from the strip while the strip is at rest; means for feeding a wire parallel with the strip; means for cutting the wire into lengths; a support for the material and the ticket cut from the strip back of the cutter for the ticket, so that the ticket will be above the material on the support; a hooked arm for holding the wire as it is being formed into a clip; a U-shaped die for bending the wire into U-shaped form while being held by the hooked arm; a presser-foot for forcing the pronged ends of the U-shaped clip over the ticket; and a lever for forcing the U-shaped portion of the clip onto the material, whereby the ticket is secured to the material by the clip.

8. The combination in a machine for securing tickets to merchandise, of a bed plate over which a ticket-strip is fed; means for intermittently feeding the strip; means for cutting the ticket from the strip at the end of the bed; a support for the material and a ticket cut from the strip beyond the cutting means; means for feeding wire through the machine; means for cutting the wire into lengths; an arm engaging the wire at the support; a vertically movable U-shaped die having grooves therein for the wire as it is bent by the die into U-shaped form to produce a clip; a presser-foot for pressing the prongs of the clip onto the ticket; and means for bending the U-shaped portion of the clip under the material, and forcing the material firmly against the ticket.

9. The combination in a machine for securing tickets to merchandise, of a bed plate over which a ticket-strip is intermittently fed; a platen in the bed; printing means above the bed at the platen for printing the ticket; a cutter for severing a ticket from the strip; a support for the material beyond the cutter, so that the severed ticket will be above the material on the support; a clip; means for presenting a U-shaped clip at the edge of the material and ticket; a presser-foot for bending one portion of the clip onto the ticket; and means for pressing the other portion of the clip onto the material, so that the material will be attached to the ticket by the clip.

10. The combination in a machine for attaching tickets to merchandise, of a bed; means for intermittently feeding a ticket-strip over the bed; means at the end of the bed for cutting a ticket from the strip while the strip is at rest; a support for material beyond the bed; means for feeding the wire through the machine; means for cutting the wire into lengths; a cam-shaft; means for driving said shaft; a hooked arm for holding the wire while being formed into a clip; a cam on the cam-shaft for actuating the arm; a die for bending the wire into U-shaped form; a cam on the cam-shaft for moving the die; a presser-foot for forcing a part of the formed clip onto a ticket when above the material; a cam on the cam-shaft for actuating said presser-foot; a lever arranged to engage the looped portion of the clip to bend it under the material and force the material against the ticket; and a cam on the cam-shaft for moving said lever.

11. The combination in a machine for applying tickets to merchandise, of a bed; means for intermittently feeding a ticket-strip over the bed; means for cutting a ticket from the strip when the strip is at rest; a support for material to which the ticket is to be applied; means for feeding wire to the machine to form a clip; means for holding a section of wire while it is being formed; a U-shaped forming die for engaging the wire at each side of the arm to bend the wire into U-shaped form, the die having guiding slots in its two faces to retain the wire in position while being bent; and means for bending the clip onto the ticket and against the underside of the material so as to attach the ticket to the material.

12. The combination in a machine for attaching tickets to merchandise, of a bed over which a perforated ticket-strip is fed; means for intermittently feeding the ticket, said means engaging one wall of a perforation in the ticket strip; means for severing the strip between the perforations to produce a ticket; a support for merchandise beyond the bed; means for feeding wire; means for cutting the wire into lengths; means for bending the wire to form a U-shaped clip; a presser-foot having a perforation therein, said perforation being so located as to be above the perforation in the ticket; means for actuating the presser-foot, so as to force the prongs of the U-shaped clip onto the face of the ticket; and means for pressing the U- shaped portion of the clip against the underside of the merchandise, the U-shaped end of the clip pressing the merchandise into the perforation of the ticket.

13. The combination in a machine for applying tickets to merchandise, of means for feeding the ticket-strip and cutting a ticket from the strip; means for feeding a wire to form a clip; a die for bending the wire into U-shaped form; a presser-foot for bending the clip over the ticket while being held by the bending die; and means for pressing the looped portion of the clip under the material after the bending die has been withdrawn and while the other portion of the clip is held by the presser-foot.

14. The combination in a machine for applying tickets to merchandise, of a bed; a pawl for feeding a ticket-strip over the bed; means for feeding wire to the machine to form a clip; a connection between the wire feeding means and the pawl for feeding the strip, so that they will move in unison; means for cutting a ticket from the strip; means for cutting the wire into given lengths; means for bending the wire into U-shaped clip form; and means for clamping the clip onto the ticket and the merchandise.

GEORGE W. HENRY, Jr.